Dec. 19, 1922. 1,439,265
F. G. SENTER.
TRANSMISSION BELT FASTENER.
FILED JULY 18, 1921.
Fig. 1.
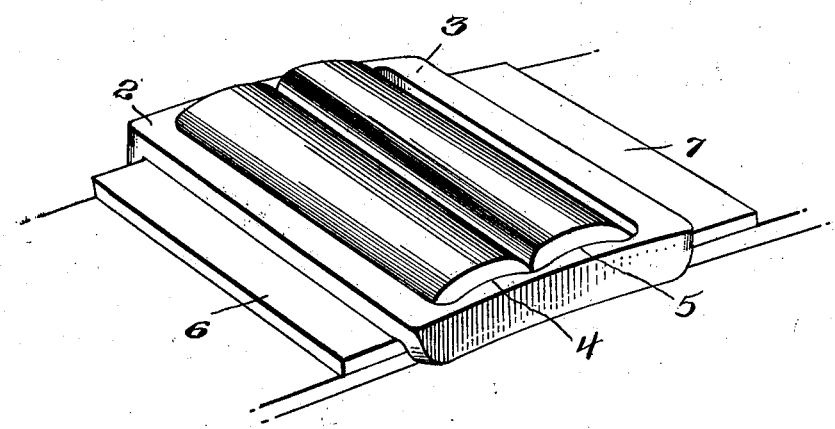
Fig. 2.
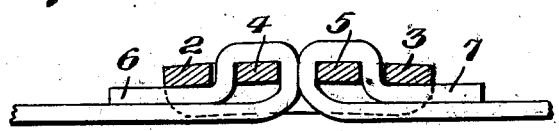
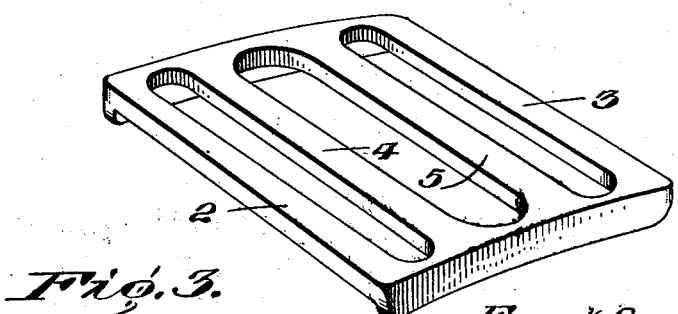
Fig. 3.
Inventor
Frank Gerrish Senter
By Emil Bönnelycke
Attorney Patented Dec. 19, 1922.

1,439,265

UNITED STATES PATENT OFFICE.

FRANK GERRISH SENTER, OF BUENOS AIRES, ARGENTINA.

TRANSMISSION-BELT FASTENER.

Application filed July 18, 1921. Serial No. 485,523.

*To all whom it may concern:*

Be it known that I, FRANK GERRISH SENTER, citizen of the United States of America, residing at Buenos Aires, Republic of Argentina, have invented certain new and useful Improvements in Transmission - Belt Fasteners, of which the following is a specification.

This invention relates to certain improvements in transmission belt fasteners its object being to provide a device of said nature specially designed to join the two ends of belts or transmission bands and which within its characteristic features may be constructed in a variety of sizes and out of suitable materials, according to the object for which it is to be used.

This system of fastener presents the following advantages over those now in use.

1st.—The joint becomes as strong as the rest of the belt, either textile, leather, rubber, balata, or made up of separate loose cords.

2nd.—The belt at the joint is not perforated nor in anyway weakened.

3rd.—Any slack in the belt can be taken up with a minimum loss of time by drawing more of the belt through the fastener.

4th.—No tools are required to adjust the fastener to the belt.

Owing to the special form of the fastener the joint becomes more solid by increased belt strain.

The fastener may be made from cast or wrought metals in a single piece or made up from several pieces although preferably it is stamped in one piece from sheet stock.

In order that my invention may be clearly understood and easily carried into practice a preferred embodiment of the same has been illustrated in the accompanying drawings, in which Figure 1 shows a perspective view of my improved fastener and the manner in which the belt end is fixed to the same. Figure 2 is a longitudinal section of the said fastener with the belt-ends in position. Fig. 3 is a perspective view of the fastener without the belt attached.

In the drawings a stamped metal frame is shown with edges, longitudinal to belt, bent down at right angles to top surface to give stiffness and avoid unnecessary lateral projection.

It will be seen that the fastener is curved longitudinally with belt. This is done to place the cross-bars 2 and 3 at a lower level than the inside cross-bars 4 and 5 this securing a greater pressure at the point of contact between the active portion of the belt and the folded-over end (6 and 7) which becomes squeezed between the cross-bars 2 and 3 and the active portion of the belt; the squeezing increasing as the belt tightens.

Many structural and other changes, may be introduced without departing from the scope of my present invention which has been clearly set forth in the appended claiming clauses.

Having now fully described and ascertained the nature of my present invention and in what manner the same is to be carried into practice, I declare that what I claim and desire to protect by my Letters Patent is:

A belt coupler, embodying a substantially rectangular integral frame comprising outer and inner pairs of cross-bars, and overhanging flange pieces connecting the ends thereof to strengthen the same; the bars of each pair being spaced from each other and from the adjacent bars of the other pair, and the flange pieces projecting downwardly an appreciable distance below all of the bars, whereby each end of the belt may be inserted upwardly through the space between the inner pair of bars and then passed backwardly across the outer face of the adjacent inner bar and inserted through the space between the latter bar and the adjacent outer bar and finally passed outwardly beneath the last-named bar; the said flange pieces extending across the side edges of the folded portions of the belt ends and the portions of the belt to which said folded portions are immediately connected for preventing lateral movement of the belt ends.

In testimony whereof I affix my signature.

FRANK GERRISH SENTER.